United States Patent
Morimura et al.

(10) Patent No.: US 8,700,942 B2
(45) Date of Patent: Apr. 15, 2014

(54) INFORMATION PROCESSING APPARATUS AND POWER SUPPLY CONTROL CIRCUIT

(75) Inventors: Takaaki Morimura, Nagano (JP); Daisuke Kawamoto, Nagano (JP); Takeshi Endo, Nagano (JP); Takeshi Masuda, Nagano (JP); Zhongchao Lv, Nagano (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 13/263,756

(22) PCT Filed: Mar. 17, 2011

(86) PCT No.: PCT/JP2011/056345
§ 371 (c)(1),
(2), (4) Date: Oct. 10, 2011

(87) PCT Pub. No.: WO2011/118487
PCT Pub. Date: Sep. 29, 2011

(65) Prior Publication Data
US 2012/0042187 A1    Feb. 16, 2012

(30) Foreign Application Priority Data

Mar. 26, 2010 (JP) ................. 2010-073229
Mar. 26, 2010 (JP) ................. 2010-073230
Mar. 26, 2010 (JP) ................. 2010-073231

(51) Int. Cl.
*G06F 1/32* (2006.01)

(52) U.S. Cl.
USPC .................... 713/340; 713/320; 713/323

(58) Field of Classification Search
CPC ............... Y02B 60/12; Y02B 60/1203; Y02B 60/1278; Y02B 60/1282; Y02B 60/1285; Y02B 60/1292; G06F 1/3206; G06F 1/3212; G06F 1/3287

USPC .................. 713/320, 323, 324, 340
See application file for complete search history.

(56) References Cited

U.S. PATENT DOCUMENTS 5,682,550 A    10/1997    Brown et al.
(Continued)

FOREIGN PATENT DOCUMENTS

CN    201397454 Y    2/2010
JP    9 6460    1/1997
(Continued)

OTHER PUBLICATIONS

International Search Report Issued May 10, 2011 in PCT/JP11/056345 filed Mar. 17, 2011.
Office Action issued Nov. 1, 2013, in Chinese Patent Application No. 201180002129.0 (with English-language Translation).

*Primary Examiner* — Glenn A Auve
(74) *Attorney, Agent, or Firm* — Oblon, Spivak, McClelland, Maier & Neustadt, L.L.P.

(57) ABSTRACT

Provided is an information processing apparatus including: a power supply control portion that performs control of a power supply; a detection signal emitting portion that, when a connection of an external power source is detected in an operation stand-by state in which power consumption is suppressed and an operation is on stand-by, emits a detection signal only for a certain time period, in accordance with the detection; and a power supply portion that supplies power to the power supply control portion based on the detection signal emitted by the detection signal emitting portion and also stops the power supply to the power supply control portion after a certain time period elapses from the connection in the operation stand-by state.

13 Claims, 12 Drawing Sheets

(56) References Cited

U.S. PATENT DOCUMENTS

| | | | |
|---|---|---|---|
| 6,266,776 B1* | 7/2001 | Sakai | 713/300 |
| 7,120,808 B2 | 10/2006 | Miyairi et al. | |
| 2004/0008462 A1* | 1/2004 | Kluth et al. | 361/90 |
| 2004/0148531 A1 | 7/2004 | Yamazaki et al. | |
| 2009/0106572 A1 | 4/2009 | Taguchi et al. | |

FOREIGN PATENT DOCUMENTS

| | | |
|---|---|---|
| JP | 11 191931 | 7/1999 |
| JP | 2001 274744 | 10/2001 |
| JP | 2004 192350 | 7/2004 |
| JP | 3121588 | 5/2006 |
| JP | 2009 116851 | 5/2009 |

* cited by examiner

INFORMATION PROCESSING APPARATUS AND POWER SUPPLY CONTROL CIRCUIT

TECHNICAL FIELD

The present invention relates to an information processing apparatus and a power supply control circuit.

BACKGROUND ART

Various attempts have been made to reduce power consumption of a personal computer. For example, in Patent Document 1, a micro computer system is disclosed by which it is possible to control a power supply to a main CPU portion in a more appropriate manner and reduce the power consumption.

With respect to a notebook-style personal computer that is driven by a battery that uses a secondary battery, there is a particularly strong demand to reduce the power consumption, in order to prolong an operating time. In known art, in a state in which the personal computer is driven by the battery, when it is in a state in which the power consumption is lower than that of normal times, such as when it is in a sleep, suspended or hibernation state (hereinafter, these states are also collectively referred to as a "stand-by state"), a power source (this is referred to as an always-on power (ALW power) source in the description below) is turned off, the power source supplying power to portions to which it is considered at least necessary to supply the power, such as an EC (Embedded Controller).

In this way, by appropriately turning off the ALW power when the battery is driven, it is possible to suppress the power consumption when the personal computer is in the sleep or suspended state etc. and to prolong a driving time when the battery is driven.

CITATION LIST

Patent Literature

Patent Literature 1: Japanese Patent Application Publication No. JP-A-2009-116851

SUMMARY OF INVENTION

Technical Problem

However, in known art, there has been a problem in that when the personal computer is in the stand-by state and connected using an AC (Alternating Current) adaptor, the ALW power is switched from off to always-on and the ALW power is thus on, resulting in excessive power consumption in comparison to a state in which the personal computer is driven by the battery alone. It is desirable to make the power consumption as close as possible to zero in a case in which the personal computer is in the stand-by state. However, since power is consumed by the EC etc. when the ALW power is turned on, there has been a problem with respect to further reducing the power consumption even when the AC adaptor is used.

Hence, the present invention is made in light of the above-described problems, and an object of the present invention is to provide a novel and improved information processing apparatus and power supply control circuit capable of further reducing power consumption in a stand-by state even when receiving power that is supplied externally by an AC adaptor etc.

Solution to Problem

According to one aspect of the present invention, in order to achieve the above-mentioned object, there is provided an information processing apparatus that includes: a power supply control portion that performs control of a power supply; a detection signal emitting portion that, when a connection of an external power source is detected during an operation stand-by state in which power consumption is suppressed and an operation is on stand-by, emits a detection signal only for a certain time period in accordance with the detection; and a power supply portion that supplies power to the power supply control portion based on the detection signal emitted by the detection signal generation portion and also stops the power supply to the power supply control portion after a certain time period elapses from the connection during the operation stand-by state.

In a case in which the power supply control portion receives the supply of power from the power supply portion based on the emission of the detection signal, the power supply control portion may determine whether it is necessary to recharge the battery and may transmit a signal that instructs the power supply portion to stop the power supply if there is no need for the recharge.

In a case in which the power supply to the power supply control portion is stopped after the certain time period elapses from the connection, the power supply portion may stop the power supply to the power supply control portion after a predetermined delay time elapses from changing other control signals.

The connection of the external power source may be an insertion of an AC adaptor.

In a case in which the power supply control portion receives the supply of power from the power supply portion based on the detection signal emitted by the detection signal emitting portion, the power supply control portion may transmit a signal that cuts off the power supply from the AC adaptor.

The connection of the external power source may be a connection of a battery.

Further, according to another aspect of the present invention in order to achieve the above-mentioned object, there is provided a power supply control circuit in which power is supplied based on a detection signal that is emitted only for a certain time period in accordance with detection of a connection of an external power source, the connection being made during an operation stand-by state in which power consumption is suppressed and an operation is on stand-by, and also, if continuous driving is not necessary during the operation stand-by state, the supply of power is stopped after a certain time period elapses from the connection.

Advantageous Effects of Invention

According to the present invention, as described above, it is possible to provide a novel and improved information processing apparatus and power supply control circuit that are capable of further reducing power consumption in a stand-by state even when power is supplied externally by an AC adaptor etc.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that the description will be made in the following order.

<Embodiment of Present Invention>
[1-1. Structure of information processing apparatus]
[1-2. Known structure and operations]
[1-3. Structure and operations of present embodiment]
[1-4. Specific example of circuits]
[1-5. Execution of timer resume function]
<2. Conclusion>

Figure 1:
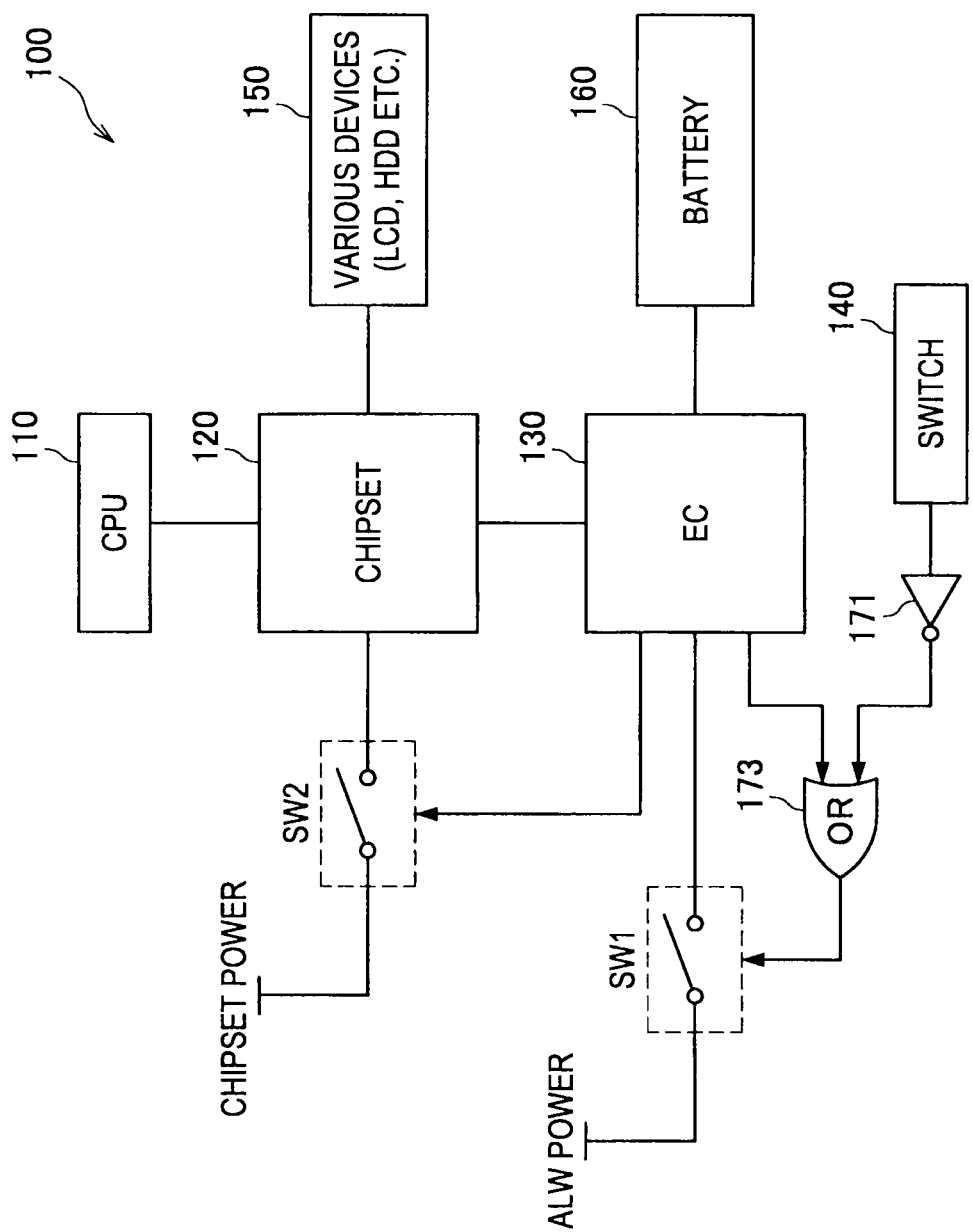
FIG. 1 is an explanatory diagram showing a structure of an information processing apparatus 100 according to an embodiment of the present invention.

Embodiment of Present Invention 1-1. Structure of Information Processing Apparatus First, a structure of an information processing apparatus 100 according to an embodiment of the present invention will be described. FIG. 1 is an explanatory diagram showing the structure of the information processing apparatus 100 according to the embodiment of the present invention. The information processing apparatus 100 shown in FIG. 1 is a notebook-style personal computer, for example, and is an apparatus that operates by receiving a supply of power by connecting to a battery or an AC adaptor. The structure of the information processing apparatus 100 according to the embodiment of the present invention will be described below with reference to FIG. 1.

As shown in FIG. 1, the information processing apparatus 100 according to the embodiment of the present invention is structured to include a CPU 110, a chipset 120, an EC (Embedded Controller) 130, a switch 140, a memory, an LCD (Liquid Crystal Display: liquid crystal display device), an HDD (Hard Disk Drive), other various devices 150 and a battery 160.

The CPU 110 controls an overall operation of the information processing apparatus 100. For example, it controls a display of an image on the LCD by reading out a computer program from the memory or HDD etc. and executing the program in sequence.

The chipset 120 is a chip that manages delivery and receipt of data between the CPU 110 and the various devices 150 inside the information processing apparatus 100. The chipset 120 may be structured with two chipsets that are called a north bridge and a south bridge, for example, or may be structured with a single chipset.

The chipset 120 is operated by receiving a supply of power from a chipset power source. The supply of power from the chipset power source is controlled by a switch SW2. Control of the opening and closing of the switch SW2 is performed by the EC 130, and when there is no need to supply power to the chipset 120, the EC 130 turns off the switch SW2 and stops the supply of power to the chipset 120.

The EC 130 performs power supply control of the information processing apparatus 100. For example, the EC 130 is structured with an LSI (Large Scale Integration Circuit). In the present embodiment, the EC 130 operates by receiving a supply of power from an ALW power. Then, FIG. 1 schematically shows a diagram in which the supply of power from the ALW power is controlled by a DC/DC converter 174. On/off control of the DC/DC converter 174 is performed by depression of the switch 140 by a user, insertion and removal of an AC adaptor (not shown in the figures) into and from the information processing apparatus 100, or attachment and removal of the battery 160. A supply control of the ALW power to the EC 130 will be described below in detail.

The switch 140 is structured to include a switch for turning on and off the power source of the information processing apparatus 100, a switch for causing a predetermined program to be started up on the information processing apparatus 100, and a switch for establishing a connection to a network and causing a predetermined website to be displayed, etc. In the information processing apparatus 100 according to the present embodiment, when the switch 140 is depressed, for example, the DC/DC converter 174 is turned on and the ALW power is supplied to the EC 130.

As described above, the various devices 150 are structured with the memory, the LCD, the HDD etc., and operations with respect to those devices are controlled by the chipset 120.

The structure of the information processing apparatus 100 according to the embodiment of the present invention has been described above with reference to FIG. 1. Next, operations of the information processing apparatus 100 according to the embodiment of the present invention will be described.

1-2. Known Structure and Operations

First, before describing the operations of the information processing apparatus 100 according to the embodiment of the present invention, a structure and operations of a known information processing apparatus will be described.

The battery 160 is removably provided in the information processing apparatus 100, and is a secondary battery that can supply power to each portion of the information processing apparatus 100 via the EC 130. When the AC adapter (not shown in the figures) is connected to the information processing apparatus 100, recharging of the battery 160 is connected. Further, when the information processing apparatus 100 is in a stand-by state, the AC adaptor is connected, and when a capacity falls below a predetermined value, recharging is performed by a control of the EC 130 or a control of a micro controller provided inside the battery 160.

In known art, when the AC adaptor is inserted into the information processing apparatus when the information processing apparatus is in the stand-by state, the ALW power is always turned on, and the AWL power is supplied to the EC. Therefore, even in a case in which the information processing apparatus is in the stand-by state, when the AC adaptor is inserted, the information processing apparatus is in a state in which a certain amount of power is being consumed.

Figure 2:
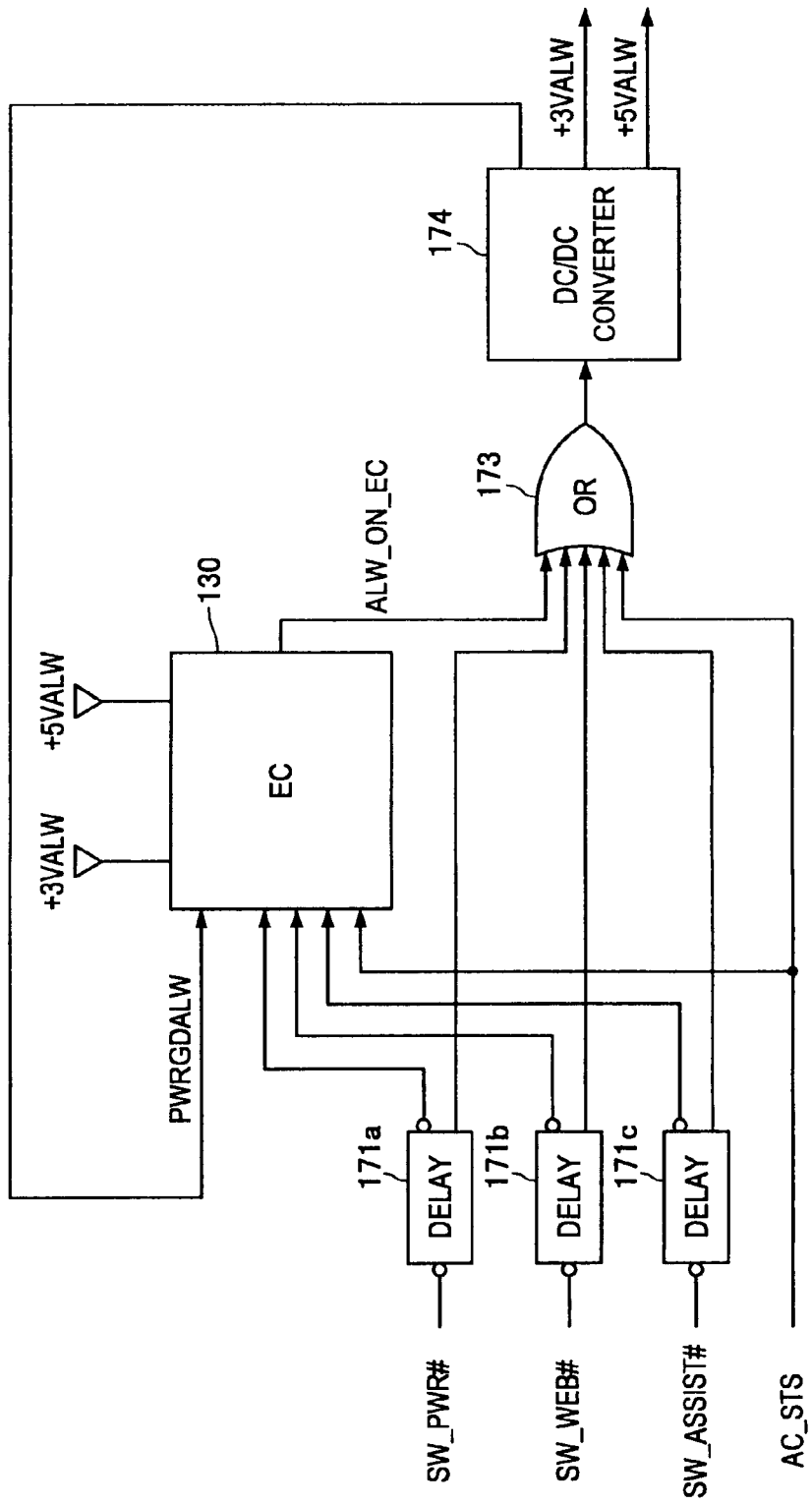
FIG. 2 shows a structure of a known information processing apparatus.

FIG. 2 shows the structure of the known information processing apparatus. Note that in FIG. 2, the same reference signs as those used in FIG. 1 are attributed to some portions for convenience of explanation.

As shown in FIG. 2, the known information processing apparatus is structured to include the EC 130, delay circuits 171a, 171b and 171c, an OR circuit 173 and the DC/DC converter 174.

The delay circuits 171a, 171b and 171c delay a signal for a predetermined time period based on an operation of the switch 140 and output the signal to the EC 130 and the OR circuit 173. In the structure of the known information processing apparatus shown in FIG. 2, the delay circuit 171a delays a signal "SW_PWR#" for the predetermined time period and outputs the signal, the signal being based on depression of a power switch. The delay circuit 171b delays a signal "SW_WEB#" for the predetermined time period and outputs the signal, the signal being based on depression of a button for establishing a connection to the Internet and browsing a homepage. The delay circuit 171c delays a signal "SW_ASSIST#" for the predetermined time period and outputs the signal, the signal being based on depression of a button for starting up a predetermined application. Note that, an application that is executed when the user depresses the switch 140 after starting up the EC 130 and activating the information processing apparatus 100 can be freely set by the user, and it is needless to say that the application is not limited to an example shown herein.

The OR circuit 173 acquires a logical sum of the signals "SW_PWR#", "SW_WEB#" and "SW_ASSIST#" that are output by the delay circuits 171a, 171b and 171c and a signal "AC_STS" that detects when the AC adaptor is connected, and performs output to the DC/DC converter 174.

The DC/DC converter 174 converts an input power (+VPWRSRC etc.) into a direct-current power of 3.3 [V] or 5 [V] and then outputs the power. Here, when any one of inputs of the OR circuit 173 changes from LOW to HIGH, the DC/DC converter 174 outputs the ALW power of 3.3 [V] (+3VALW) or the ALW power of 5 [V] (+5VALW), and when the ALW power reaches 3.3 [V], the DC/DC converter 174 outputs a power good (PWRGDALW) signal to the EC 130.

The signals "SW_PWR#", "SW_WEB#" and "SW_ASSIST#" that are output by the delay circuits 171a, 171b and 171c and the signal "AC_STS" that detects when the AC adaptor is connected are input into the EC 130. The EC 130 can start an operation by receiving the input of the signals. Further, in a case in which it is wished that the EC 130 be continuously supplied with the ALW power of 3.3 [V], the EC 130 outputs a signal "ALW_ON_EC" to the OR circuit 173 and notifies the DC/DC converter 174 to continue to supply the ALW power.

Figure 3:
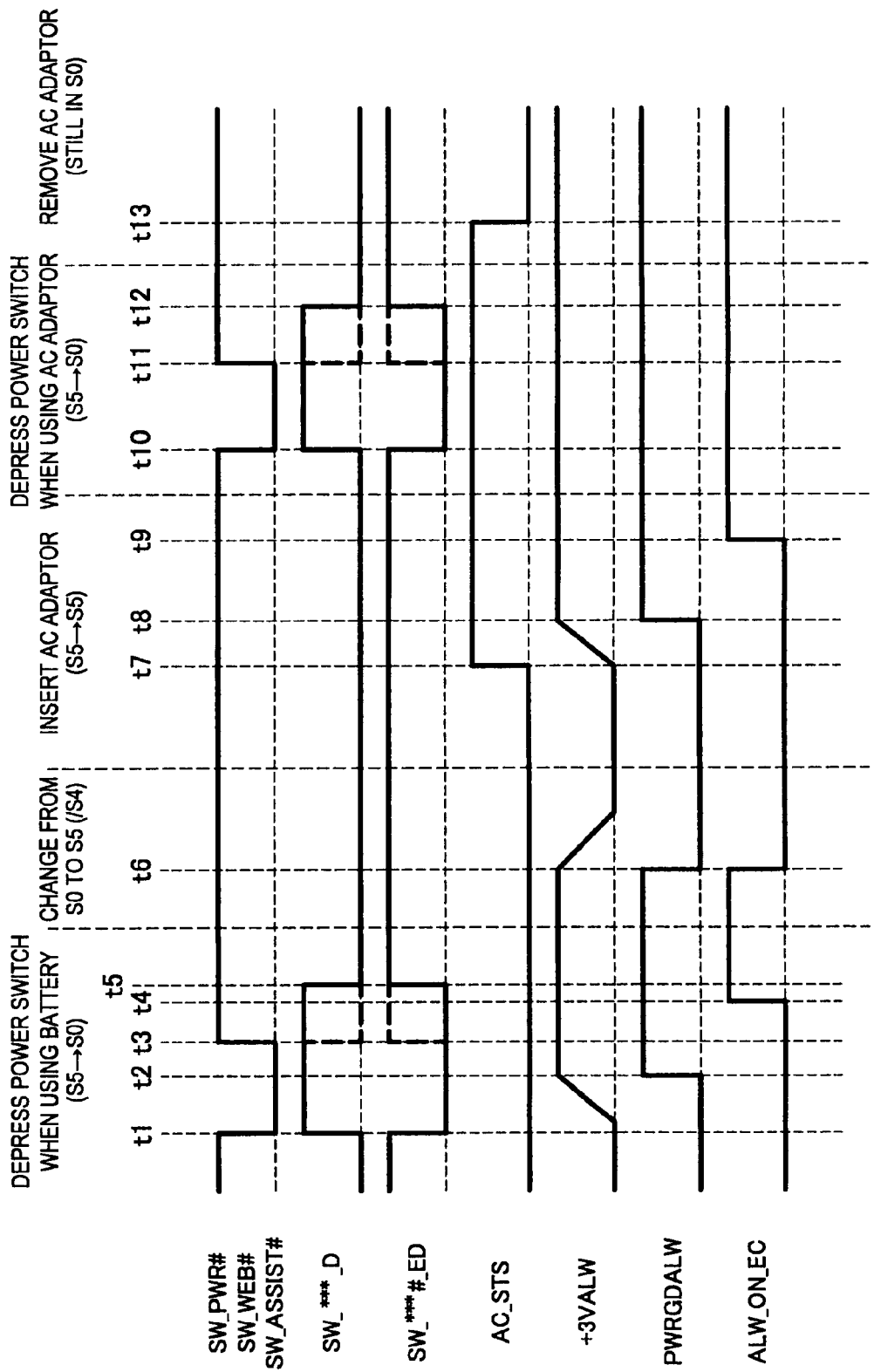
FIG. 3 is an explanatory diagram showing shifting of signals in the structure shown in FIG. 2 using a timing chart.

Operations of the structure shown in FIG. 2 will be described. FIG. 3 is an explanatory diagram showing shifting of signals in the structure shown in FIG. 2 using a timing chart.

First, terminology will be explained. An information processing apparatus that includes the structure shown in FIG. 2 operates while shifting through a plurality of states. In FIG. 3, the shifting of the signals are shown in a case in which the information processing apparatus that includes the structure shown in FIG. 2 operates while shifting through two (or three) states described below.

S0: A state in which the information processing apparatus is fully operating

S5: A state in which the information processing apparatus is OFF (S4: A state in which the information processing apparatus is hibernating)

A difference between the S4 state and the S5 state is that in the S4 state, a current state of the information processing apparatus is sheltered in a hard disk etc. and the information processing apparatus operates in a state similar to a state in which the power is turned off, namely in a power-saving mode in which the power is saved as much as possible while keeping part of the power turned on that is necessary for causing the information processing apparatus to be started up at a certain time. Meanwhile, in the S5 state, the power is completely turned off. Therefore, the S5 state is superior in terms of power-saving effects.

On the timing chart shown in FIG. 3, only the battery is connected to the information processing apparatus, and the starting point is a case in which the information processing apparatus is in the S5 state in a state in which the AC adaptor is not connected. Here, when the user of the information processing apparatus depresses a switch at a time point of a time t1 to turn on the power source of the information processing apparatus, the information processing apparatus shifts from the S5 state to the S0 state. Then, based on the depression of the switch, a state of one of the signals "SW_PWR#", "SW_WEB#" and "SW_ASSIST#" changes.

When the state of one of the signals "SW_PWR#", "SW_WEB#" and "SW_ASSIST#" changes at the time point of the time t1, the DC/DC converter 174 that receives an input of the signal starts outputting the ALW power of 3.3 [V] (+3VALW). Note that, since there is a start-up time in units of several hundred μS to several ms of the DC/DC converter 174, a slight time lag arises before the DC/DC converter 174 actually starts outputting the ALW power after it receives the input of the signal.

When the ALW power that is output by the DC/DC converter 174 reaches 3 [V] at a time t2, the DC/DC converter 174 outputs the power good (PWRGDALW) signal to the EC 130 after changing the signal from LOW to HIGH. After that, at a time point of a time t3, the state of one of "SW_PWR#", "SW_WEB#" and "SW_ASSIST#" returns to an original HIGH state.

The EC 130 that has received the power good signal of the HIGH state from the DC/DC converter 174 outputs the ALW_ON_EC signal at a time t4, after changing the signal from LOW to HIGH. Then, at a time t5, "SW_ * * * _D" changes from HIGH to LOW, while at the same time "SW_ * * * #_EC" changes from LOW to HIGH.

After that, at a time point of a time t6, when the state of the information processing apparatus changes from the S0 state to the S5 state or to the S4 state by an operation by the user of the information processing apparatus, for example, the EC 130 causes the ALW_ON_EC signal to change from HIGH to LOW. The DC/DC converter 174 stops outputting the ALW power of 3.3 [V] (+3VALW), and at the same time outputs the power good (PWRGDALW) signal to the EC 130 after changing the signal from HIGH to LOW. Here, the EC 130 stops consuming any power, and a state arises in which the power consumption of the information processing apparatus is significantly reduced.

In a case in which the information processing apparatus is in the S5 state (or the S4 state), when the AC adaptor is inserted into the information processing apparatus at a time point of a time t7, a signal "AC_STS" that indicates a connection state of the AC adaptor changes from LOW to HIGH. The DC/DC converter 174 that receives the AC_STS via the OR circuit 173 starts outputting the ALW power of 3.3 [V] (+3VALW). When the ALW power that is output by the DC/DC converter 174 reaches 3 [V] at a time t8, the DC/DC converter 174 outputs the power good (PWRGDALW) signal to the EC 130 after changing the signal from LOW to HIGH.

The EC 130 that has received the power good signal of the HIGH state from the DC/DC converter 174 outputs the ALW_ON_EC signal at a time t9, after changing the signal from LOW to HIGH. As a result of this, while the information processing apparatus remains in the S5 state, the ALW power is supplied to the EC 130 and the EC 130 is operated by the ALW power.

After that, the state of the information processing apparatus remains in the S5 state, and in a state in which the AC adaptor is inserted into the information processing apparatus, when the user of the information processing apparatus depresses the switch at a time t10 and turns on the power of the information processing apparatus, the information processing apparatus shifts from the S5 state to the S0 state. Then, based on the depression of the switch, the state of one of the signals "SW_PWR#", "SW_WEB#" and "SW_ASSIST#" changes from HIGH to LOW, and after that, at a time point of a time t11, the state of one of "SW_PWR#", "SW _WEB#" and "SW_ASSIST#" returns to the original HIGH state. Then, at a time t12, "SW_ * * * _D" changes from HIGH to LOW, while at the same time "SW_ * * * #_EC" changes from LOW to HIGH.

Then, the state of the information processing apparatus remains in the S0 state, and in a state in which the AC adaptor is inserted into the information processing apparatus, when the AC adaptor is removed from the information processing apparatus at a time t13, "AC_STS" that indicates the connection state of the AC adaptor changes from HIGH to LOW.

In known art, an output of the ALW power from the DC/DC converter 174 has been controlled in this manner, and in a case in which the state of the information processing apparatus is in the S5 state (or the S4 state), the power consumption of the EC 130 is suppressed by turning off the ALW power. However, when the AC adaptor is inserted in a case in which the information processing apparatus is in the S5 state (or the S4 state), there has been a problem in which the EC 130 and an AC adaptor switch circuit end up consuming a certain amount of power even in the S5 state (or the S4 state), since the ALW power and the AC adaptor switch circuit remain always-on.

Hence, when the AC adaptor is inserted in a case in which the state of the information processing apparatus is the S5 state (or the S4 state), the information processing apparatus 100 according to the present embodiment generates a pulse that changes the state for a certain time period from the signal that indicates the connection state of the AC adaptor, and controls on and off of the ALW power and the AC adaptor switch circuit based on the pulse. As a result of this, even when the AC adaptor is inserted in a case in which the information processing apparatus 100 is in the S5 state (or the S4 state), when there is no need for any operation (for example, when there is no need to recharge the battery 160), it becomes possible to suppress the power consumption of the EC 130 and the AC adaptor switch circuit.

1-3. Structure and Operations of Present Embodiment

Figure 4:
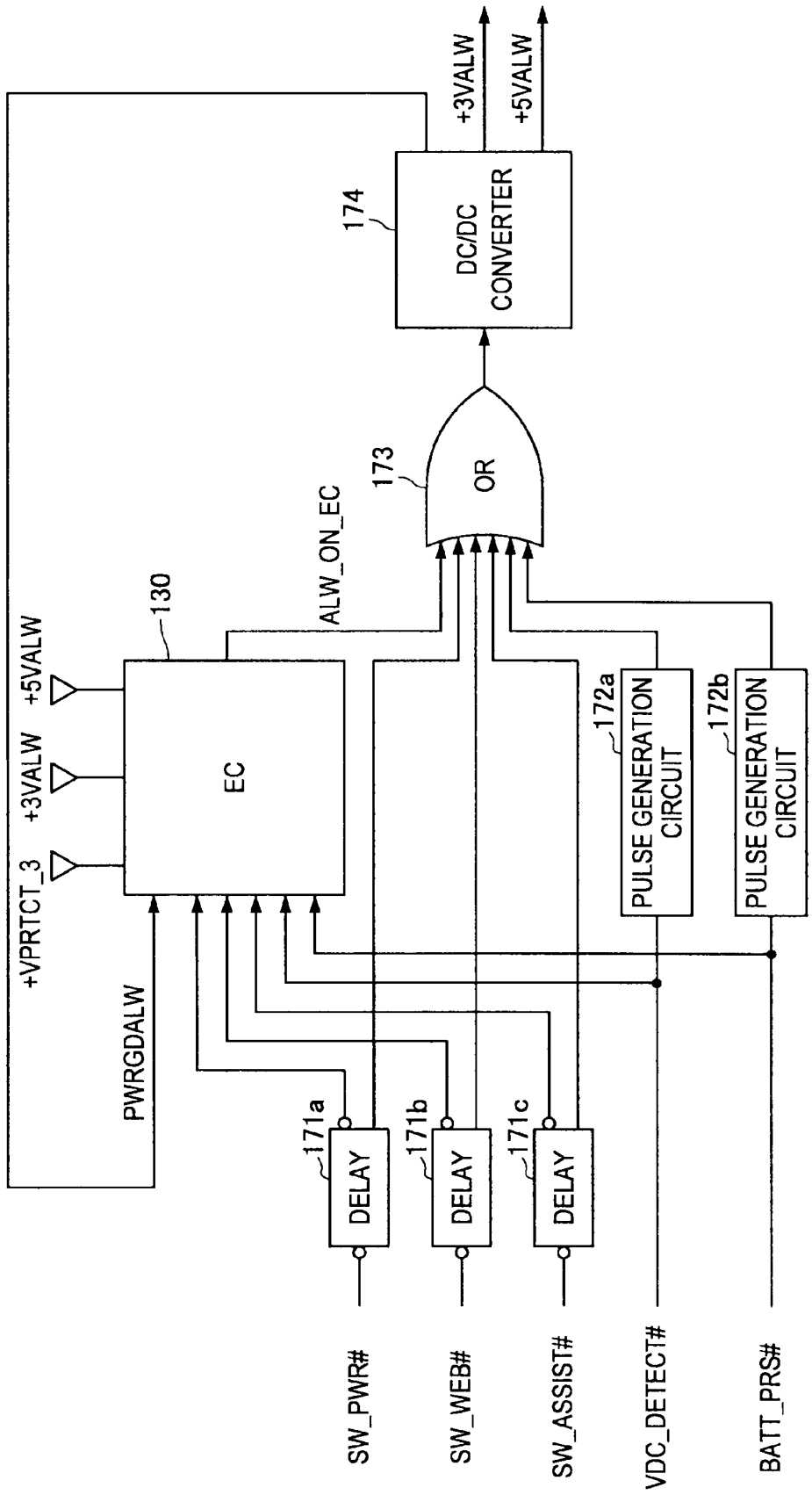
FIG. 4 is an explanatory diagram showing a control structure of a power supply to an EC 130 that is included in the information processing apparatus 100 according to the embodiment of the present invention.

FIG. 4 is an explanatory diagram showing a structure relating to control of a power supply to the EC 130 that is included in the information processing apparatus 100 according to the embodiment of the present invention.

Compared with the structure shown in FIG. 2, in the structure shown in FIG. 4, a pulse generation circuit 172a that generates a pulse that changes the state only for a certain time period from a signal "VDC_DETECT#" that indicates the connection state of the AC adaptor and a pulse generation circuit 172b that generates a pulse that changes the state only for a certain time period in a similar manner from a signal "BATT_PRS#" that indicates a connection state of a battery are added.

In the present embodiment, the pulse generation circuits 172a and 172b maintain a LOW state at normal times. Then, when the AC adaptor is inserted into the information processing apparatus 100 or the battery 160 is connected to the information processing apparatus 100, a pulse that gets into a HIGH state for a certain time period is generated. The DC/DC converter 174 receives the pulse, and in response to the applied pulse, the DC/DC converter 174 can keep the ALW power turned on for a predetermined time period.

Figure 5:
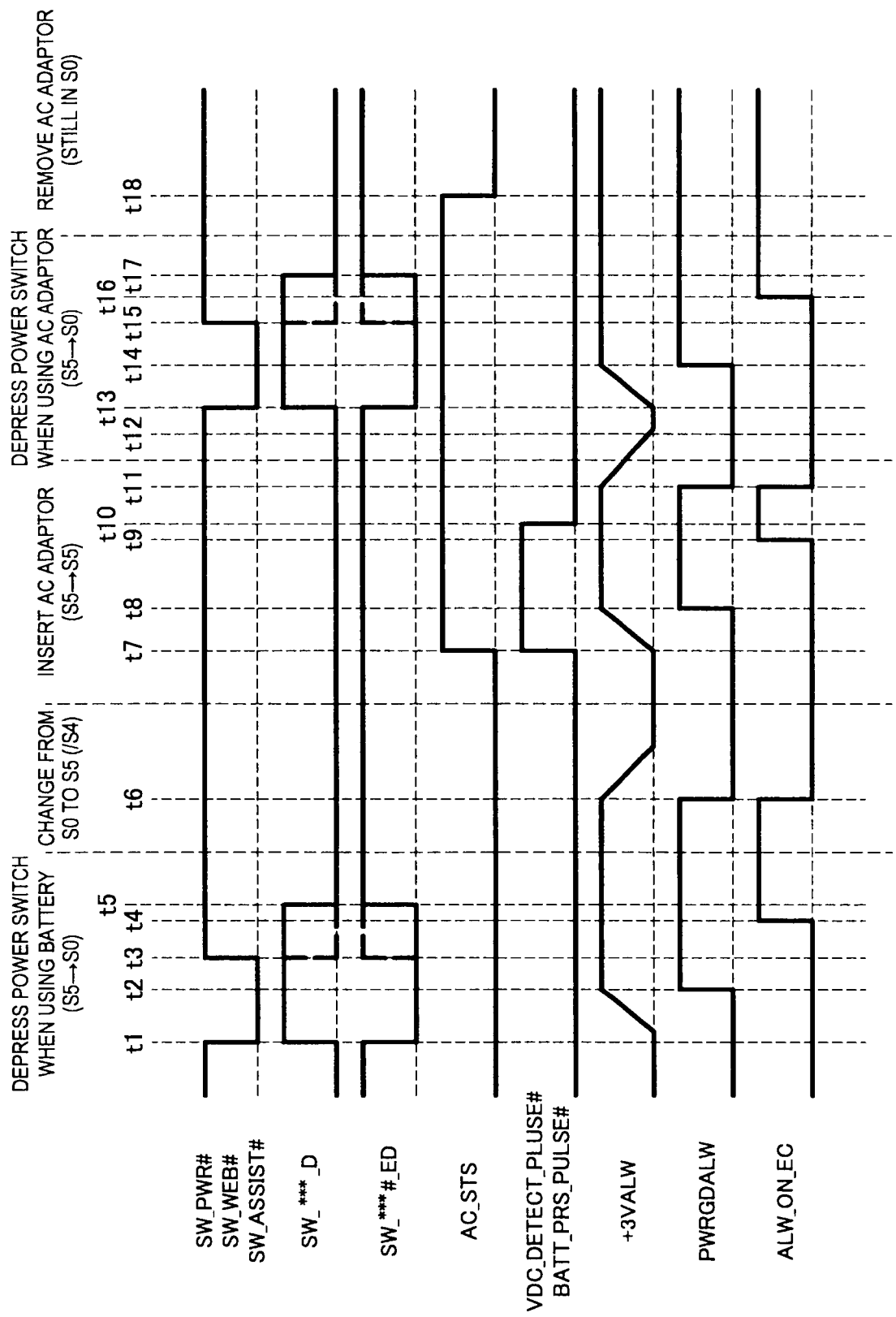
FIG. 5 is an explanatory diagram showing shifting of signals in the structure shown in FIG. 4 using a timing chart.

FIG. 5 is an explanatory diagram showing the shifting of the signals in the structure shown in FIG. 4 using a timing chart. FIG. 5 shows the shifting of the signals in a case in which the information processing apparatus 100 that includes the structure shown in FIG. 4 operates while shifting the state between the S0 state and the S5 state.

In the timing chart shown in FIG. 5, similarly to the timing chart shown in FIG. 3, the starting point is a case in which the information processing apparatus is in the S5 state in a state in which the AC adaptor is not connected. Here, when the user of the information processing apparatus 100 depresses the switch at the time point of the time t1 to turn on the power of the information processing apparatus, the information processing apparatus 100 shifts from the S5 state to the S0 state. Then, based on the depression of the switch, the state of one of the signals "SW_PWR#", "SW_WEB#" and "SW_AS-SIST#" changes.

When the state of one of the signals "SW_PWR#", "SW_WEB#" and "SW_ASSIST#" changes at the time point of the time t1, the DC/DC converter 174 that receives the input of the signal starts outputting the ALW power of 3.3 [V] (+3VALW). Note that since there is the start-up time in units of several hundred μS to several ms of the DC/DC converter 174, the slight time lag arises before the DC/DC converter 174 actually starts outputting the ALW power after it receives the input of the signal.

When the ALW power that is output by the DC/DC converter 174 reaches 3 [V] at the time t2, the DC/DC converter 174 outputs the power good signal (PWRGDALW) to the EC 130 after changing the signal from LOW to HIGH. After that, at the time point of the time t3, the state of one of the signals "SW_PWR#", "SW_WEB#" and "SW_ASSIST#" returns to the original HIGH state.

The EC 130 that has received the power good signal of the HIGH state from the DC/DC converter 174 outputs the ALW_ON_EC signal at the time t4, after changing the signal from LOW to HIGH. Then, at the time t5, the signal "SW_ * * * _D" changes from HIGH to LOW, while at the same time the signal "SW_ * * * #_EC" changes from LOW to HIGH.

After that, at the time point of the time t6, when the state of the information processing apparatus 100 changes from the S0 state to the S5 state or the S4 state, for example, by being operated by the user of the information processing apparatus, the EC 130 causes the ALW_ON_EC signal to change from HIGH to LOW. The DC/DC converter 174 stops outputting the ALW power of 3.3 [V] (+3VALW), and at the same time outputs the power good (PWRGDALW) signal to the EC 130 after changing the signal from HIGH to LOW. Here, the EC 130 stops consuming any power, and a state arises in which the power consumption of the information processing apparatus 100 is significantly reduced.

In a case in which the information processing apparatus 100 is in the S5 state (or the S4 state), when the AC adaptor is inserted into the information processing apparatus 100 at the time point of the time t7, the signal "VC_DETECT" that indicates the connection state of the AC adaptor changes from LOW to HIGH. Then, from the "VDC_DETECT", "VDC_DETECT_PULSE" that is generated by the pulse generation circuit 172a changes from LOW to HIGH as well.

Note that when the battery 160 is connected in a state in which the AC adaptor is inserted into the information processing apparatus 100, "BATT_PRS_PULSE" which is generated by the pulse generation circuit 172b from the signal "BATT_PRS" that indicates the connection state of the battery 160, changes from LOW to HIGH.

As a result of the "VDC_DETECT_PULSE" (or the "BATT_PRS_PULSE") changing from LOW to HIGH, the DC/DC converter 174 starts outputting the ALW power of 3.3 [V] (+3VALW). When the ALW power that is output by the DC/DC converter 174 reaches 3.3 [V] at the time t8, the DC/DC converter 174 outputs the power good (PWRGDALW) signal to the EC 130 after changing the signal from LOW to HIGH.

The EC 130 that has received the power good signal of the HIGH state from the DC/DC converter 174 outputs the ALW_ON_EC signal at the time t9 after changing the signal from LOW to HIGH. As a result of this, in a state in which the information processing apparatus 100 remains in the S5 state (or the S4 state), the ALW power is supplied to the EC 130 and the EC 130 is operated by the ALW power.

After that, at the time t10, when a predetermined time period elapses after the signal "VDC_DETECT_PULSE" (or the signal "BATT_PRS_PULSE") changes from LOW to HIGH, the pulse generation circuit 172a outputs the signal "VDC_DETECT_PULSE" (or the signal "BATT_PRS_PULSE") after changing the signal from HIGH to LOW.

Then, at the time t11, after a certain time period (for example, several hundred [mS]) has elapsed after the signal "VDC_DETECT_PULSE" (or the signal "BATT_PRS_PULSE") changes from LOW to HIGH, if the EC 130 determines that there is no need to perform any process, such as a process of recharging the battery 160, for example, the EC 130 changes the ALW_ON_EC signal from HIGH to LOW. The DC/DC converter 174 stops outputting the ALW power of 3.3 [V] (+3VALW), and at the same time outputs the power good (PWRGDALW) signal to the EC 130 after changing the signal from HIGH to LOW. Here, the EC 130 stops consuming any power, and the state arises in which the power consumption of the information processing apparatus 100 is significantly reduced.

Then, at the time t12, a state arises in which an output of the ALW power of 3.3 [V] (+3VALW) from the DC/DC converter 174 is completely stopped.

After that, in a state in which the information processing apparatus 100 remains in the S5 state or the S4 state and the AC adaptor is inserted into the information processing apparatus 100, when the user of the information processing apparatus 100 depresses the switch 140 at the time t13 and turns on the power of the information processing apparatus 100, the information processing apparatus 100 shifts from the S5 state or the S4 state to the S0 state. At that time point, since the ALW power supplied from the DC/DC converter 174 is off, the DC/DC converter 174 starts outputting the ALW power of 3.3 [V] (+3VALW) in response to the depression of the switch 140.

Then, based on the depression of the switch 140, the state of one of the signals "SW_PWR#", "SW_WEB#" and "SW_ASSIST#" changes from HIGH to LOW, and after that, at a time point of a time t15, the state of one of the signals "SW_PWR#", "SW_WEB#" and "SW_ASSIST#" returns to the original HIGH state. Then, at a time t17, "SW_ * * * _D" changes from HIGH to LOW, while at the same time "SW_ * * * #_EC" changes from LOW to HIGH.

When the ALW power that is output by the DC/DC converter 174 reaches 3 [V] at the time t14, the DC/DC converter 174 outputs the power good (PWRGDALW) signal to the EC 130 after changing the signal from LOW to HIGH.

The EC 130 that receives the power good signal of the HIGH state from the DC/DC converter 174 outputs the ALW_ON_EC signal at a time t16, after changing the signal from LOW to HIGH. By supplying the ALW power to the EC 130 in this way, it becomes possible to recover from the stand-by state.

Then, in a state in which the state of the information processing apparatus remains in the S0 state and the AC adaptor is inserted into the information processing apparatus, when the AC adaptor is removed from the information processing apparatus at a time t18, the signal "AC_STS" that indicates the connection state of the AC adaptor changes from HIGH to LOW.

With reference to FIG. 5, the shifting of the signals is described above based on a case in which the information processing apparatus 100 that includes the structure shown in FIG. 4 operates while shifting the state between the S0 state and the S5 state (or the S4 state). In this way, in a case in which the AC adaptor is inserted when the state of the information processing apparatus 100 is the S5 state (or the S4 state), by generating the pulse that it is in the HIGH state for the certain time period and outputting the pulse to the DC/DC converter 174, it is possible to output the ALW power from the DC/DC converter 174 in accordance with a change of a state of the pulse and to turn on the ALW power for a predetermined time period and turn off the ALW power again. As a result of this, in a case in which the state of the information processing apparatus 100 is the stand-by state, it becomes possible to reduce the power consumption when the AC adaptor is inserted.

Note that although it is described that the operations of the above-described information processing apparatus 100 according to the embodiment of the present invention are performed by hardware, in the present invention, a series of the above-described operations may also be performed by software.

As described above, in the information processing apparatus 100 according to the embodiment of the present invention, the delay circuits 171a, 171b and 171c are provided to reliably take in start-up factors (for example, the depression of the switch 140, the insertion of the AC adaptor or the connection of the battery 160) when the EC 130 is started up by receiving the supply of the ALW power.

However, among the start-up factors, there are some factors that cause different operations due to different behaviors. The most evident one is the power switch. Although the information processing apparatus 100 is started up when the power switch is simply depressed, the information processing apparatus 100 is forcibly shut down when the power switch is depressed continuously for a certain time period.

For this reason, once the EC 130 is started up, if the delay circuit 171a has a substantially similar delay time, there is a possibility that the EC 130 may malfunction. As one example, in a case in which the user depresses the power switch repeatedly, if the delay time is set to be long, the EC 130 may recognize the repeated depression of the power switch as the continuous depression of the power switch and there is a risk that the information processing apparatus 100 may be forcibly shut down.

Therefore, in a state in which the EC is once started up, it is preferable that the delay time of the delay circuit 171a is shortened to avoid this type of malfunction. By shortening the delay time of the delay circuit 171a, it is possible to inhibit occurrence of such as the above-described malfunction after the EC 130 is started up.

Figure 6:
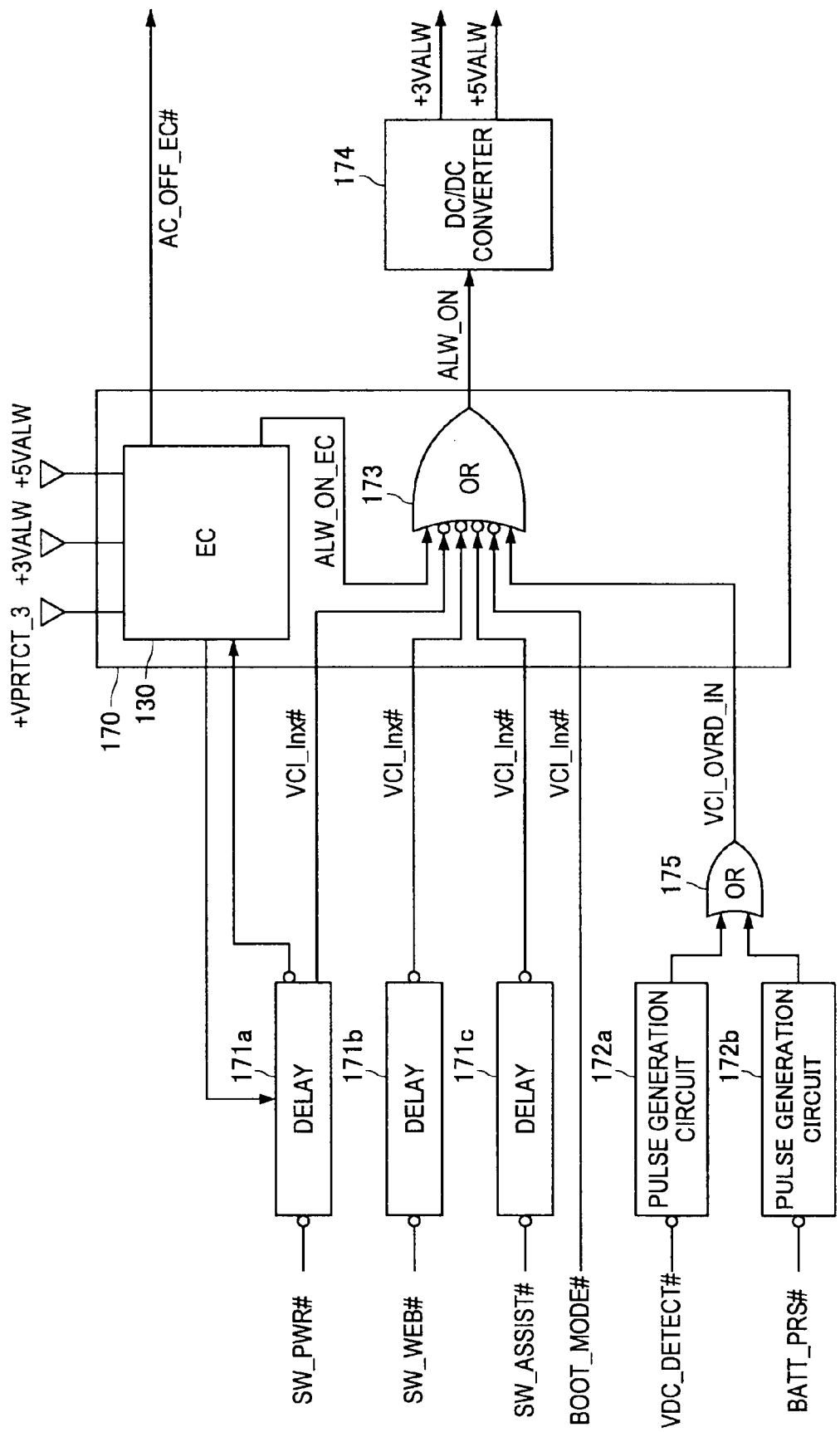
FIG. 6 is an explanatory diagram showing another example of the structure relating to the control of the power supply to the EC 130.

FIG. 6 is an explanatory diagram showing another example of the structure relating to the control of the power supply to the EC 130 that is included in the information processing apparatus 100 according to the embodiment of the present invention.

In FIG. 6, the EC 130 and the OR circuit 173 that are shown in FIG. 4 are illustrated in a state in which they are integrated on one chip 170. Then, in FIG. 6, it is illustrated how the pulses that are generated by the pulse generation circuits 172a and 172b are output to an OR circuit 175. In this way, when the AC adaptor is inserted or the battery 160 is connected, the pulse that is in the HIGH state for the certain time period is output to the OR circuit 173. Note that "BOOT_MODE#" shown in FIG. 6 is a signal that is used to write firmware onto the EC 130 when the information processing apparatus 100 is manufactured, for example.

When the EC 130 shown in FIG. 6 is started up by receiving the supply of the ALW power from the DC/DC converter 174, it outputs to the delay circuit 171a a signal SUS_ON_EC that indicates that the EC 130 is started up. As a result of starting up the EC 130, the delay circuit 171a that receives the SUS_ON_EC shortens the delay time. Then, when the ALW power that is supplied from the DC/DC converter 174 is turned off and the operation of the EC 130 is stopped, the output of SUS_ON_EC is stopped. The delay circuit 171a, into which SUS_ON_EC is no longer input, returns the delay time to an original time. By outputting, from the EC 130 to the delay circuit 171a, the signal that indicates the operating state of the EC 130 in this way, in accordance with whether the EC 130 is started up or not, it is possible to change the delay time of the delay circuit 171a.

Figure 7:
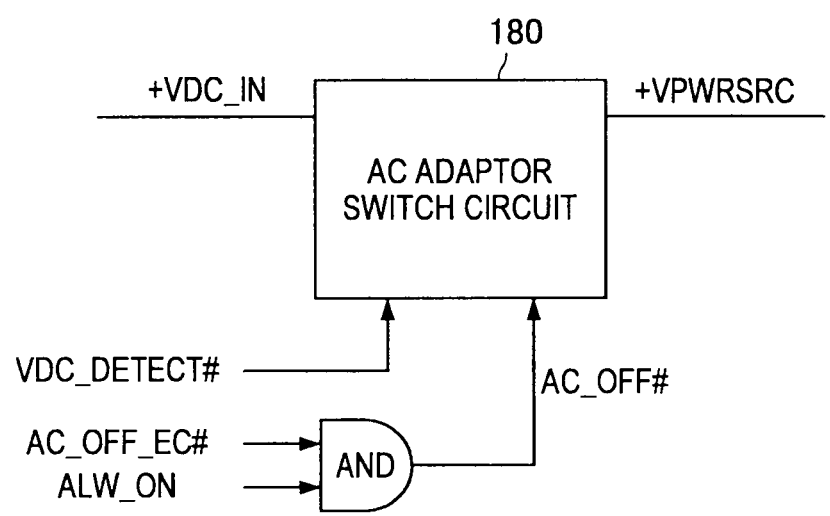
FIG. 7 is an explanatory diagram showing an example of a structure of an AC adapter switch circuit 180.

FIG. 7 is an explanatory diagram showing a structure of the AC adapter switch circuit 180 that controls the power supply from the AC adaptor. In known art, in a case in which a normal AC adaptor is inserted, the AC adaptor switch circuit 180 is turned on by receiving a supply of the signal "VDC_DETECT#" and outputs "+VPWRSRC" in response to a supply of +VDC_IN. Here, "+VPWESRC" is a power source that becomes an input to a main circuit of the information processing apparatus 100 and to the DC/DC converter 174 that supplies to the main circuit.

In the present embodiment, even when the normal AC adaptor is inserted, the EC 130 (and a power supply control circuit that controls a power source) can stop the AC adaptor switch circuit 180 from being turned on. In the present embodiment, a signal that stops the AC adaptor switch circuit 180 from being turned on is defined as "AC_OFF#". Therefore, the AC adaptor switch circuit 180 according to the present embodiment has a structure in which a cancellation is made by the "AC_OFF#" after the signal "VDC_DETECT#" that indicates that the insertion of the AC adaptor is detected (indicates that a normal voltage is input).

In a case when the ALW power is turned off and the AC adaptor switch circuit 180 is turned off, a theoretical power consumption of the information processing apparatus 100 is a combined value of leakage power of the AC adaptor switch circuit 180 and power consumption of a circuit that receives a power supply from the AC adaptor switch circuit 180 from the AC adaptor side (including power consumption of the power supply control circuit of the present embodiment and a power source for a timer of the EC 130).

1-4. Specific Example of Circuits

Figure 8:
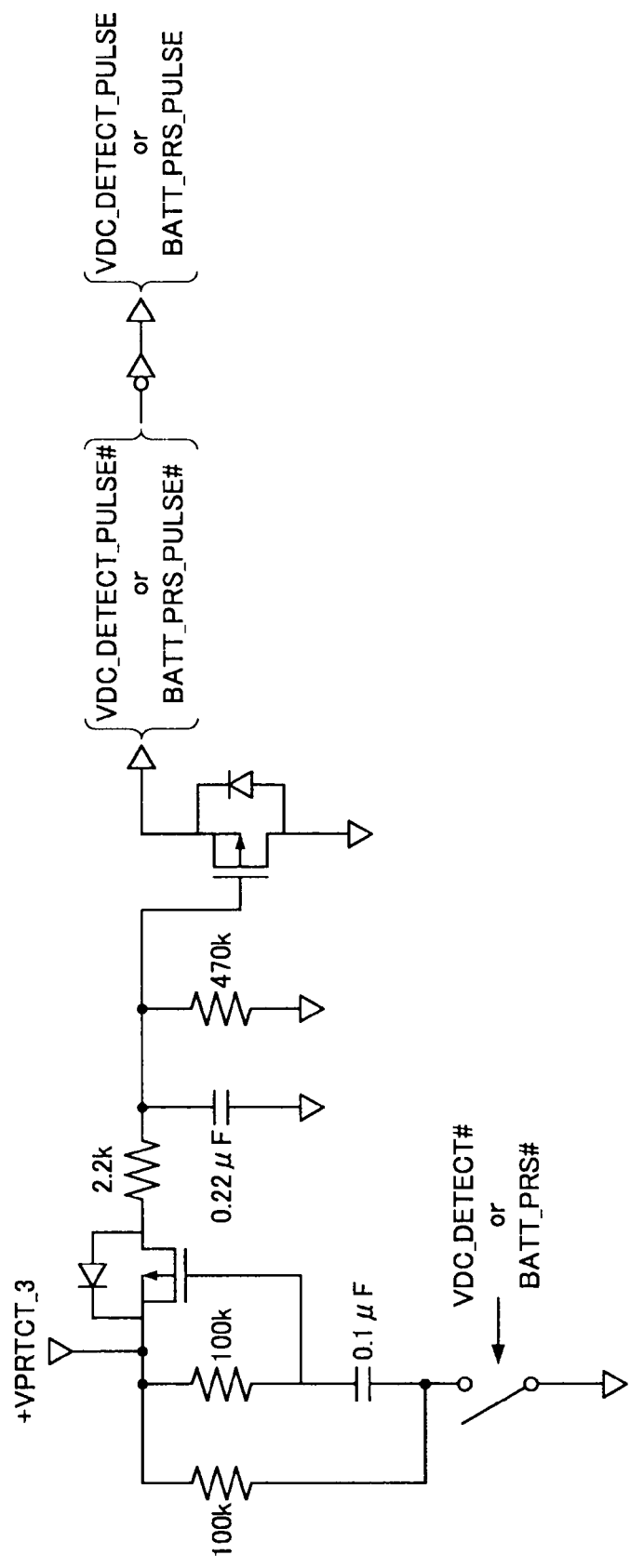
FIG. 8 is an explanatory diagram showing a specific example of a circuit for generating VDC_DETECT_PULSE from VDC_DETECT.

Next, one specific example of a circuit of each circuit that performs the above-described processing will be shown. FIG. 8 is an explanatory diagram showing one specific example of a circuit of the pulse generation circuits 172a and 172b that generate the signal "VDC_DETECT_PULSE" from the signal "VDC_DETECT#" and a signal "BATT_DETECT_PULSE#" from the signal "BATT_PRS#". The circuit shown in FIG. 8 is one example of a circuit that generates and outputs the pulse that is in the HIGH state for a certain time period as a result of detecting the signal "VDC_DETECT#" or the signal "BATT_DETECT_PULSE#".

By mounting the pulse generation circuits 172a and 172b using the circuit as shown in FIG. 8, for example, it is possible to generate the pulse that is in the HIGH state for a certain time period after the AC adaptor or the battery 160 is attached to the information processing apparatus 100. As a matter of course, the circuit shown in FIG. 8 is one example when mounting the pulse generation circuits 172a and 172b, and it is needless to say that the pulse generation circuits 172a and 172b are not limited to the circuit structure shown in FIG. 8.

Figure 9:
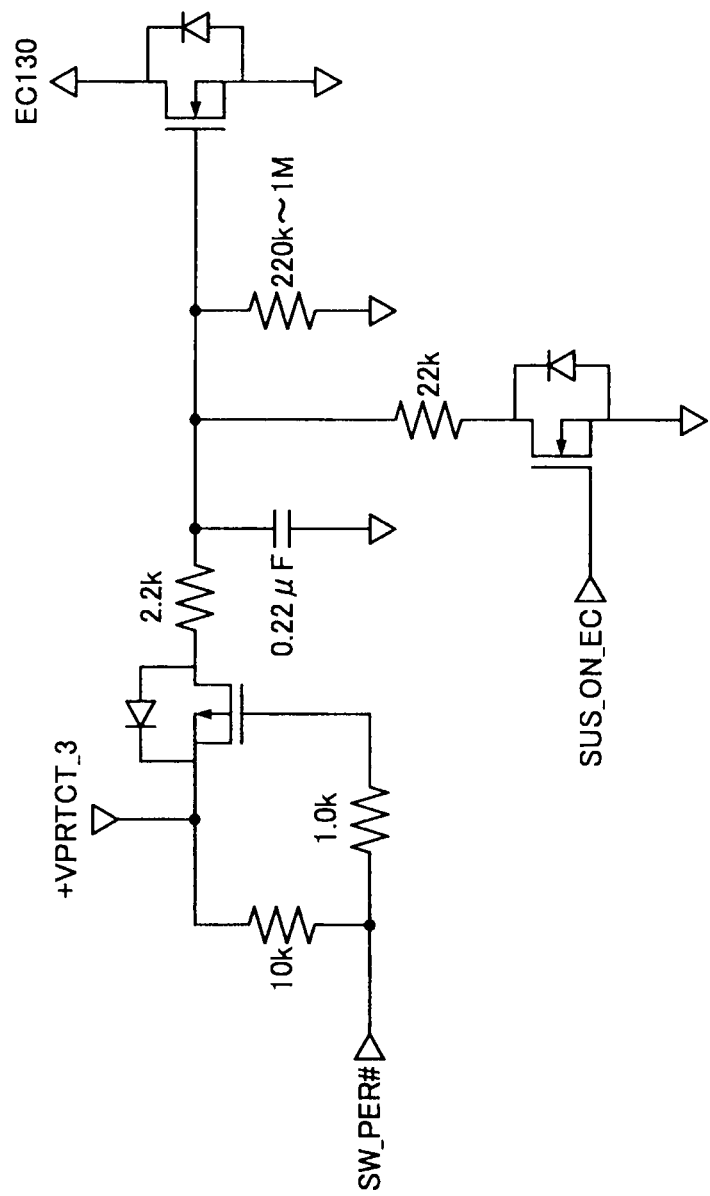
FIG. 9 is an explanatory diagram showing a specific example of a circuit of a delay circuit 171*a*.

FIG. 9 is an explanatory diagram showing one specific example of a circuit of the delay circuit 171a. With a circuit structure shown in FIG. 9, the delay circuit 171a can change the delay time based on a state of the signal "SUS_ON_EC". As a matter of course, it is needless to say that a specific circuit structure of the delay circuit 171a is not limited to the one shown in FIG. 9, and it is sufficient that the delay time be variable based on an application of the signal "SUS_ON_EC".

Figure 10:
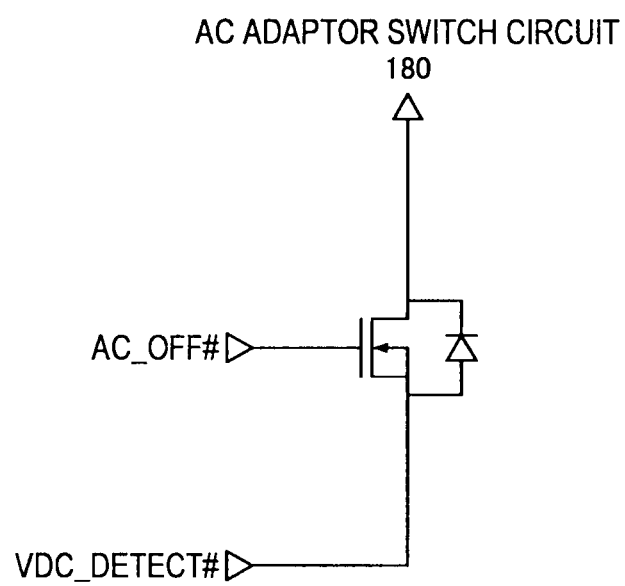
FIG. 10 is an explanatory diagram showing a specific example of a circuit for performing control inside the AC adaptor switch circuit 180 using VDC_DETECT# and AC_OFF#.

FIG. 10 is an explanatory diagram showing one specific example of a circuit for controlling an output of VDC_DETECT# inside the AC adaptor switch circuit 180. By structuring the AC adaptor switch circuit 180 as shown in FIG. 10, it is possible to stop the AC adaptor switch circuit 180 from being turned on even when the signal "VDC_DETECT#" becomes HIGH, as long as the signal "AC_OFF#" does not become HIGH.

As described above, when the AC adaptor is inserted into the information processing apparatus 100 in a case in which the information processing apparatus 100 is in the stand-by state, it is possible to reduce the power consumption by turning on the ALW power only for a certain time period to operate the EC 130 and then by causing the EC 130 to stop operating through turning off the ALW power and the AC adaptor switch circuit 180.

1-5. Execution of Timer Resume Function

A function is sometimes integrated into the information processing apparatus 100 that performs a predetermined process at a time specified in advance. For example, there is a case in which a tuner that receives television broadcasting is built into the information processing apparatus 100 and processing to record a television broadcast of a specified channel at a reserved time is performed. In addition, there is also a case in which a function of recharging a battery at certain intervals (a maintenance charge function) is performed to maintain a capacity of the battery that discharges by itself. In such cases, by using a built-in timer in the EC 130 (or a timer that can be controlled from the EC 130) instead of using a built-in timer of the chipset 120, it is possible to perform the above-described functions while suppressing the power consumption of the information processing apparatus 100.

Figure 11:
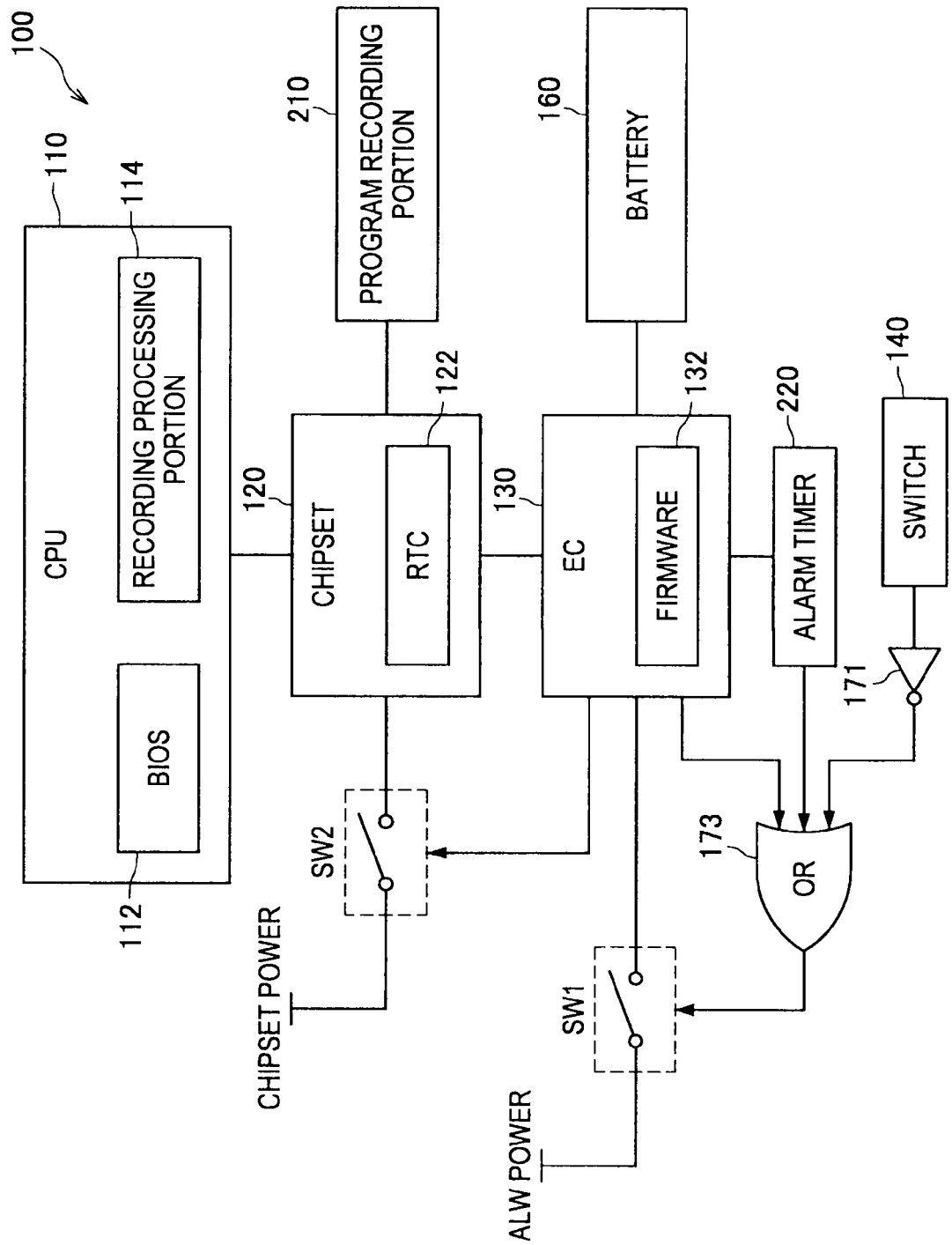
FIG. 11 is an explanatory diagram showing another example of the structure of the information processing apparatus 100 according to the embodiment of the present invention.

FIG. 11 is an explanatory diagram showing another structural example of the information processing apparatus 100 according to the embodiment of the present invention. With reference to FIG. 11, another structural example of the information processing apparatus 100 according to the embodiment of the present invention will be described below.

Compared with the information processing apparatus 100 shown in FIG. 1, the information processing apparatus 100 shown in FIG. 11 is different with respect to points in which the CPU 110 includes a BIOS 112 and a recording processing portion 114, the chipset 120 includes a RTC (Real Time Clock) 122, and the EC 130 includes firmware 132. Further, a program recording portion 210 that operates based on control from the chipset 120 and an alarm timer 220 that is controlled from the EC 130 are added to the information processing apparatus 100 shown in FIG. 1.

The program recording portion 210 is structured with the tuner that receives the television broadcasting and an HDD etc. that stores the received television broadcast. The program recording portion 210 has a function of recording a broadcast of a channel for a time period specified by the user and storing it onto the HDD.

The alarm timer 220 is a timer having a structure such that it can be operated by control of the EC 130, and the alarm timer 220 outputs to the DC/DC converter 174 a signal that causes the ALW power to be turned on at a time specified in advance.

With reference to FIG. 11, another structural example of the information processing apparatus 100 according to the embodiment of the present invention has been described above. Next, an operational example of the information processing apparatus 100 having such a structure will be described.

Figure 12:
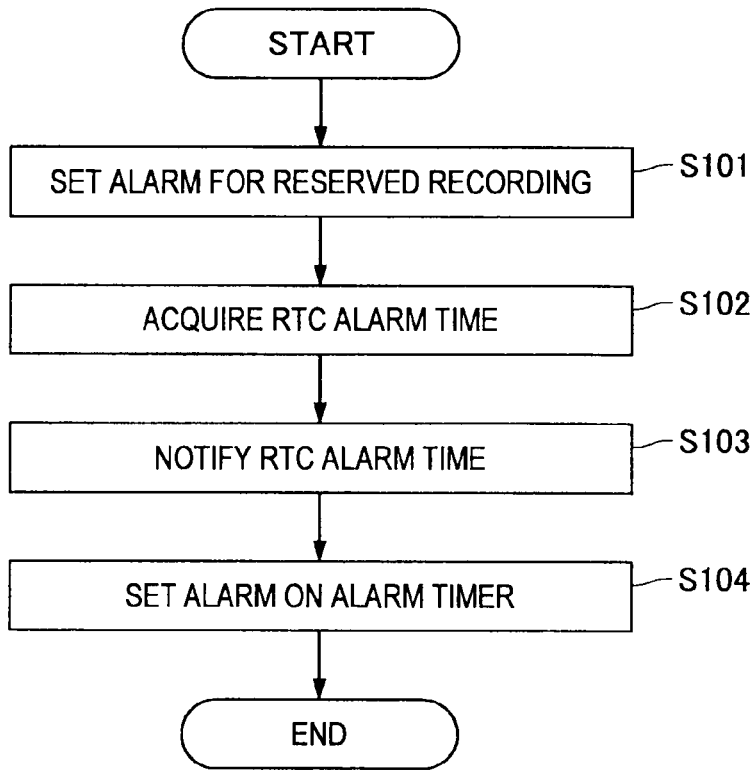
FIG. 12 is a flow diagram showing an example of an operation of the information processing apparatus 100 shown in FIG. 11.

FIG. 12 is a flow diagram showing an operational example of the information processing apparatus 100 shown in FIG. 11. The flow diagram shown in FIG. 12 shows an operational example in which a recording reservation of a program is performed by the user. With reference to FIG. 12, the operational example of the information processing apparatus 100 shown in FIG. 11 will be described below.

First, when the recording reservation is performed by the user, the recording processing portion 114 performs an alarm setting of a reserved recording with respect to the RTC 122 (step S101).

When the recording processing portion 114 performs the alarm setting to the RTC 122, the BIOS 122 acquires a time set on the RTC 112 (a RTC alarm time) (step S102).

The BIOS 112 that acquires the RTC alarm time set on the RTC 112 notifies the RTC alarm time to the firmware 132 of the EC 130 (step S103).

Although the firmware 132 that acquires the RTC alarm time sets the RTC alarm time on the alarm timer 220, if a time to perform a maintenance charge for the battery 160 comes earlier, the firmware 132 sets that time on the alarm timer 220 (step S104).

In this way, by notifying a recording start time and a maintenance charge performance time from the EC 130 to the alarm timer 220, even when the EC 130 is not receiving the supply of the ALW power and is in a non-operating state, the alarm timer 220 can output a signal for starting the supply of the ALW power when a specified time comes.

Figure 13:
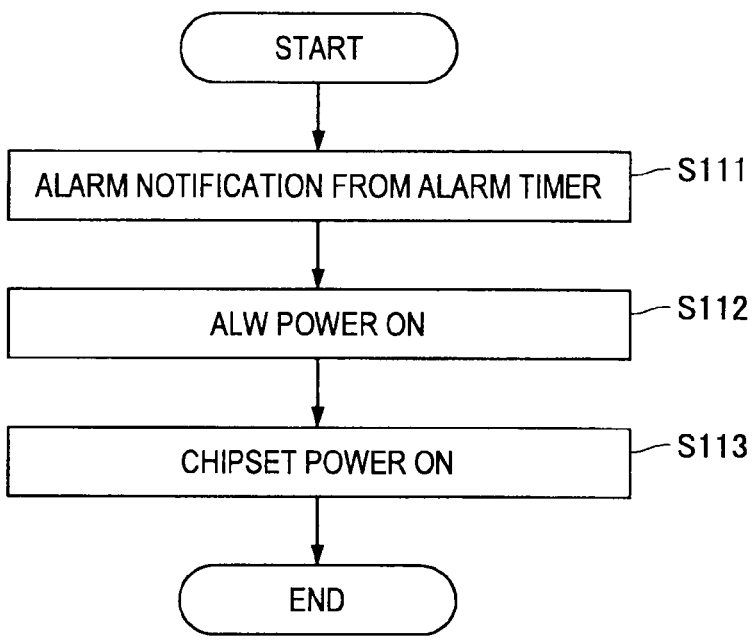
FIG. 13 is a flow diagram showing an example of an operation of the information processing apparatus 100 shown in FIG. 11.

FIG. 13 is a flow diagram showing the operational example of the information processing apparatus 100 shown in FIG. 11. The flow diagram shown in FIG. 12 shows the operational example in which the time specified to the alarm timer 220 by the EC 130 arrives in a state in which the ALW power is not supplied to the EC 130, the AC adaptor is inserted into the information processing apparatus 100 and the state of the information processing apparatus 100 is the S5 state (or the S4 state). With reference to FIG. 13, the operational example of the information processing apparatus 100 shown in FIG. 11 will be described below.

When the time specified to the alarm timer 220 by the EC 130 arrives in a state in which the ALW power is not supplied to the EC 130, the AC adaptor is inserted into the information processing apparatus 100 and the state of the information processing apparatus 100 is the S5 state (or the S4 state), the alarm timer 220 issues an alarm to inform what the time has done (step S111). Note that when the reserved recording is performed in the information processing apparatus 100, it is preferable for the alarm timer 220 to issue the alarm slightly earlier than the recording start time in order to start the recording exactly from the specified recording start time.

When the alarm is issued from the alarm timer 220, schematically, the DC/DC converter 174 shown in FIG. 11 is turned on and then the ALW power is turned on (step S112).

The EC 130 that is started up by receiving the supply of the ALW power outputs a signal to turn on the chipset power source (step S113). The chipset 120 that receives the supply of the power after the chipset power source is turned on starts processing of recording a program reserved for recording or starts maintenance charge processing. When the recording processing is started, an internal state of the information processing apparatus 100 changes from the S5 state (or the S4 state). Note that the signal from the EC 130 to turn on the chipset power source need not necessarily be output from the EC 130, if the processing that is performed at the specified time is the maintenance charge processing of the battery 160.

In this way, by having the structure in which the alarm timer 220 outputs the signal to turn on the ALW power when the time specified by the EC 130 arrives and the ALW power is supplied from the DC/DC converter 174 to the EC 130, it is possible to automatically turn on the ALW power at the specified time and to start up the EC 130 even in a state in which the AC adaptor is inserted into the information processing apparatus 100 and the ALW power is turned off.

Here, it is possible to suppress the power consumption in the stand-by state by using the alarm timer 220, which consumes less power than the chipset 120, instead of the RTC of the chipset 120.

Note that although the present embodiment has a structure in which the alarm timer 220 is used that is separate from the EC 130 and is controllable from the EC 130, the present invention is not limited to such an example. For example, a structure may be adopted in which the alarm timer 220 is built into the EC 130 and the alarm timer 220 can be operated even in a case in which the ALW power is turned off and the EC 130 is not started up.

2. Conclusion

As described above, according to the embodiment of the present invention, when the AC adaptor is inserted in a case in which the information processing apparatus 100 is in the stand-by state, the information processing apparatus 100 outputs to the DC/DC converter 174 and the AC adaptor switch circuit the pulse that is in the HIGH state for a certain time period after the timing of the insertion. The DC/DC converter 174 that receives the input of the pulse turns on the ALW power and outputs the power to the EC 130, and when the EC 130 determines that there is no need to keep the ALW power turned on, it turns off the ALW power and at the same time turns off the AC adaptor switch circuit.

By controlling on and off of the ALW power and the AC adaptor switch circuit in this way, it is possible to suppress the power consumption even when the AC adaptor is inserted in a case in which the information processing apparatus 100 is in the stand-by state.

In addition, according to the embodiment of the present invention, after the ALW power is turned on and the EC 130 is started up, control is performed for shortening the delay time of the delay circuits that take in the start-up factors of the EC 130. By shortening the delay time of the delay circuits in this way, it is possible to avoid false recognition in which the repeated depression of a power button by the user is mistaken for the continuous depression of the power button.

In addition, with the information processing apparatus 100 according to the embodiment of the present invention, in a case in which predetermined processing is performed at a specified time, the timer, which is controllable from the EC 130 that consumes less power than the chipset 120, is used to turn on the ALW power. In this way, the information processing apparatus 100 according to the embodiment of the present invention can perform the predetermined processing at the specified time in a state in which the ALW is turned off and the EC 130 is not started up.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

The present invention can be applied to an information processing apparatus and a power supply control circuit, and, particularly in a case in which power is supplied externally by an AC adaptor etc., it can be applied to an information processing apparatus and a power supply control circuit that reduce power consumption when they are in a stand-by state.

REFERENCE SIGNS LIST

100 Information processing apparatus
110 CPU
112 BIOS
114 Recording processing portion
120 Chipset
122 RTC
130 EC
132 Firmware
140 Switch
150 Various devices
160 Battery
171a, 171b, 171c Delay circuit
172a, 172b Pulse generation circuit
173, 175 OR circuit
174 DC/DC converter
180 AC adaptor switch circuit
210 Program recording portion
220 Alarm timer

The invention claimed is:

1. An information processing apparatus comprising:
a power supply control portion that performs a control of a power supply;
a detection signal emitting portion that, when a connection of an external power source is detected during an operation stand-by state in which power consumption is suppressed and an operation is on stand-by, emits a detection signal only for a certain time period in accordance with the detection; and
a power supply portion that supplies power to the power supply control portion based on the detection signal emitted by the detection signal emitting portion and also stops the power supply to the power supply control portion after a certain time period elapses from the connection during the operation stand-by state.

2. The information processing apparatus according to claim 1,
wherein, in a case in which the power supply control portion receives the supply of power from the power supply portion based on the emission of the detection signal, the power supply control portion determines whether it is necessary to recharge a battery and transmits a signal that instructs the power supply portion to stop the power supply if there is no need for the recharge.

3. The information processing apparatus according to claim 1,
wherein, in a case in which the power supply to the power supply control portion is stopped after the certain time period elapses from the connection, the power supply portion stops the power supply to the power supply control portion after a predetermined delay time elapses from changing other control signals.

4. The information processing apparatus according to claim 1,
wherein the connection of the external power source is an insertion of an AC adaptor.

5. The information processing apparatus according to claim 4,
wherein, in a case in which the power supply control portion receives the supply of power from the power supply portion based on the detection signal emitted by the detection signal emitting portion, the power supply control portion transmits a signal that cuts off the power supply from the AC adaptor.

6. The information processing apparatus according to claim 1,
wherein the connection of the external power source is a connection of a battery.

7. A power supply control circuit,
wherein power is supplied based on a detection signal that is emitted only for a certain time period in accordance with detection of a connection of an external power source, the connection being made during an operation stand-by state in which power consumption is suppressed and an operation is on stand-by, and also, if continuous driving is not necessary during the operation stand-by state, the supply of power is stopped after a certain time period elapses from the connection.

8. An information processing apparatus comprising:
a power supply control circuit configured to perform a control of a power supply;
a detection signal emitting circuit configured to, when a connection of an external power source is detected during an operation stand-by state in which power consumption is suppressed and an operation is on stand-by, emit a detection signal only for a certain time period in accordance with the detection; and
a power supply circuit configured to supply power to the power supply control circuit based on the detection signal emitted by the detection signal emitting circuit and also stop the power supply to the power supply control circuit after a certain time period elapses from the connection during the operation stand-by state.

9. The information processing apparatus according to claim 8,
wherein, in a case in which the power supply control circuit receives the supply of power from the power supply circuit based on the emission of the detection signal, the power supply control circuit determines whether it is necessary to recharge a battery and transmits a signal that instructs the power supply circuit to stop the power supply if there is no need for the recharge.

10. The information processing apparatus according to claim 8,
wherein, in a case in which the power supply to the power supply control circuit is stopped after the certain time period elapses from the connection, the power supply circuit stops the power supply to the power supply control circuit after a predetermined delay time elapses from changing other control signals.

11. The information processing apparatus according to claim 8,
wherein the connection of the external power source is an insertion of an AC adaptor.

12. The information processing apparatus according to claim 11,
wherein, in a case in which the power supply control circuit receives the supply of power from the power supply circuit based on the detection signal emitted by the detection signal emitting circuit, the power supply control circuit transmits a signal that cuts off the power supply from the AC adaptor.

13. The information processing apparatus according to claim 8,
wherein the connection of the external power source is a connection of a battery.

* * * * *